United States Patent

Tomikawa

[11] Patent Number: 5,716,159
[45] Date of Patent: Feb. 10, 1998

[54] SPLINE AND SPLINE FOR ROTARY ELEMENTS OF MULTI SPINDLE EXTRUDER

[75] Inventor: Kazuto Tomikawa, Shizuoka-ken, Japan

[73] Assignee: Toshiba Kikai Kabushiki Kaisha, Tokyo, Japan

[21] Appl. No.: 653,835

[22] Filed: May 28, 1996

[30] Foreign Application Priority Data

May 29, 1995 [JP] Japan .................................. 7-130468

[51] Int. Cl.$^6$ ...................................... F16B 7/00
[52] U.S. Cl. .......................... 403/359; 403/404; 464/158
[58] Field of Search .................... 403/359, 410, 403/298, 404; 464/158, 159; 192/70.2; 74/462

[56] References Cited

U.S. PATENT DOCUMENTS

| 4,149,431 | 4/1979 | Rouverol | 74/462 |
| 4,302,047 | 11/1981 | Esser | 74/462 X |
| 4,357,137 | 11/1982 | Brown | 464/159 X |
| 4,673,342 | 6/1987 | Saegusa | 74/462 X |
| 4,922,781 | 5/1990 | Peiji | 74/462 |
| 4,938,731 | 7/1990 | Nguyen et al. | 464/158 |

FOREIGN PATENT DOCUMENTS

| 22942 | 3/1978 | Japan | 74/462 |
| 13866 | 1/1987 | Japan | 74/462 |
| 630474 | 10/1978 | U.S.S.R. | 74/462 |
| 676786 | 7/1979 | U.S.S.R. | 74/462 |
| 2199633 | 7/1988 | United Kingdom | 74/462 |

*Primary Examiner*—Harry C. Kim
*Attorney, Agent, or Firm*—Finnegan, Henderson, Farabow, Garrett & Dunner, L.L.P.

[57] ABSTRACT

A tooth-profile shaped spline convenient to rotary elements of a multi spindle extruder is provided. The spline has a tooth profile which can be provided by deforming a continuous curve as if the x-axis ran on a center circle of predetermined radius. This continuous curve before deformation is a continuous line obtained by connecting a semi-circular or semi-oval line, the line being represented by an expression of $x^2/a^2+y^2/b^2=1$ in a defined area of $y \geq 0$, with another semi-circular or semi-oval line, the another line being represented by the expression of $x^2/a^2+y^2/b^2=1$ in a defined area of $y \leq 0$, by turns.

20 Claims, 4 Drawing Sheets

SPLINE AND SPLINE FOR ROTARY ELEMENTS OF MULTI SPINDLE EXTRUDER

BACKGROUND OF THE INVENTION

1. Technical Field

The present invention relates to a spline and a spline for rotary elements of a multi spindle extruder.

2. Description of the Related Art

As a spline for transmitting driving force between a spindle member and an equipment member having a bore into which the spindle member is engaged, there are well-known a straight-sided spline having a polygonal tooth profile and an involute spline having an involute tooth profile, both of which are standardized in JIS (Japanese Industrial Standard) and popularized.

A screw element or a needing disc of a multi spindle extruder and a drive shaft (a screw shaft) are connected with each other in a rotational relationship through a spline. Hitherto, either straight-sided spline or involute spline has been used as the spline. Note, in this specification, rotary elements will be the general term for these screw element and needing disc, hereinafter.

FIG. 1 shows a screw section of a double-spindle extruder where two spindles mesh with each other while rotating in the same directions. In FIG. 1, reference numeral 51 denotes a barrel provided with a screw chamber 53. The screw chamber 53 has a binocular-shaped cross section, consisting of circular cross sectional passages 53a and 53b partially overlapped with each other. In each of the circular cross sectional passages 53a and 53b, a combination of a screw element 55 having a rugby-ball shaped cross section and a screw shaft 57 is adapted so as to rotate therein about an axis of each passage 53a, 53b.

The screw shaft 57 is inserted into a through hole 59 formed in the screw element 55, so that the screw element 55 and the screw shaft 57 are spline-connected with each other by a spline 61 formed on the inner face of the through hole 59 and another spline 68 formed on the outer face of the screw shaft 57.

Since the involute spline has a large face-width of each dedendum part in comparison with that of the straight-sided spline while there is no need to provide each dedendum part of the shaft with a clearance groove, so that the involute spline exhibits a large power-transmitting capability in comparison with that of the straight-sided spline, it is also used as a spline for transmitting torque between the above-mentioned screw element 55 and the screw shaft 57.

In the above-mentioned extruder, the rotation of the screw shaft 57 is transmitted into the screw element 55 through the spline connection consisting of the splines 61 and 63, so that the rotation of the screw element 55 causes resinous materials to be mixed and sheared in the barrel 51. Consequently, on the front side in the rotating direction of the screw element 55, it is subject to a great rotational resistance through its tip portion of the large diameter part in contact with the resinous materials. Thus, due to the rotational resistance, concentration of stress is raised at each bottom of the teeth in either the straight-sided spline or the involute spline, so that each bottom of the spline is apt to have fatigue breaking.

Generally, it is required that the screw element 55 has a dimension D of its small diametrical part to be as small as possible in a view of extruding efficiency, while the screw shaft 57 has a diameter to be as much as possible in order to transmit torque required for mixing the resinous materials. Thus, the screw element 55 has the small diametrical part of extremely reduced thickness in comparison with that of the large diametrical part.

Since the so-thin small diametrical part of the screw element 55 is easy to be deformed, a slip is caused between the spline of the screw shaft 57 and another spline of the screw element 55 in the involute spline, corresponding to the transmission of large torque, so that a gap is produced in the rotating direction of the screw element 55 while expanding to the radial direction. In case that an extent of the radial expansion and the gap in the rotating direction are large together, a stress acting on each bottom of the spline is increased, so that the respective spline bottoms will be broken under fatigue at the small diametrical part of the screw element 55.

In order to reduce such a stress concentration on the respective spline bottom, it may be expected to connect the respective spline bottoms with each other by smooth arcs of a large curvature. However, if spline tooth surfaces on both sides will be connected to each other by the above smooth arc while still remaining an involute-shaped tooth profile, a thickness of the small diametrical part of the screw element 55 will be further reduced thereby to lower the strength of durability.

SUMMARY OF THE INVENTION

It is therefore an object of the present invention to provide a spline and a spline for rotary elements of a multi spindle extruder, both of which make it difficult to occur the concentration of stress, the radial expansion and the shifting in the rotating direction and which does not cause a thickness of portions about the splines to be decreased, so that the strength can be ensured.

The object of the present invention described above can be accomplished by a tooth-profile shaped spline comprising:

in a plane of x-y orthogonal coordinate system, a tooth profile which can be provided by deforming a continuous curve as if the x-axis of the plane containing the continuous curve ran on a center circle of predetermined radius;

wherein the continuous curve before deformation is a continuous line obtained by connecting a semi-circular or semi-oval line, the line being represented by an expression of $x^2/a^2+y^2/b^2=1$ (wherein a, b are constants) in a defined area of $y \geq 0$, with another semi-circular or semi-oval line, the another line being represented by the expression of $x^2/a^2+y^2/b^2=1$ (wherein a, b are constants) in a defined area of $y \leq 0$, by turns.

According to the present invention, there is also provided another tooth-profile shaped spline comprising:

in a plane of x-y orthogonal coordinate system, a tooth profile which can be provided by symmetrizing a curve with respect to the y-axis of the plane;

wherein the curve is represented by expressions as follows:

in a range of $0 < \theta < (a/Rm)$, $$x = \{Rm + b\sqrt{(1 - Rm^2\theta^2/a^2)}\}\sin\theta$$

-continued $$y = \{Rm + b\sqrt{(1 + Rm^2\theta^2/a^2)}\}\cos\theta;$$

in a range of (a/Rm)<θ<(2a/Rm), $$x = \{Rm - b\sqrt{(1 - (2a - Rm\theta)^2/a^2)}\}\sin\theta$$

$$y = \{Rm - b\sqrt{(1 - (2a - Rm\theta)^2/a^2)}\}\cos\theta;$$

wherein Rm is a radius of a center circle of the tooth profile;
  θ is a rotational angle from the y-axis as a center of the origin of the coordinate axes;
  a is a constant; and
  b is a constant;

In either tooth-profile shaped spline, the tooth face are intersecting with the center circle at right angles, while the spline is formed so as to have semi-oval or semi-circular tooth forms (teeth) contoured by respective continuous curves with large curvatures, which run from the center circle inwardly and outwardly.

Furthermore, according to the invention, there is provided a spline for spline-connecting a rotary element of a multi spindle extruder with a drive shaft for rotating the rotary element, wherein the spline is constituted by either one of the above-mentioned tooth-profile shaped splines.

These and other objects and features of the present invention will become more fully apparent from the following description and appended claims taken in conjunction with the accompany drawing.

DESCRIPTION OF THE PREFERRED EMBODIMENT

An embodiment of the present invention will be described with reference to the drawings.

Figure 1:
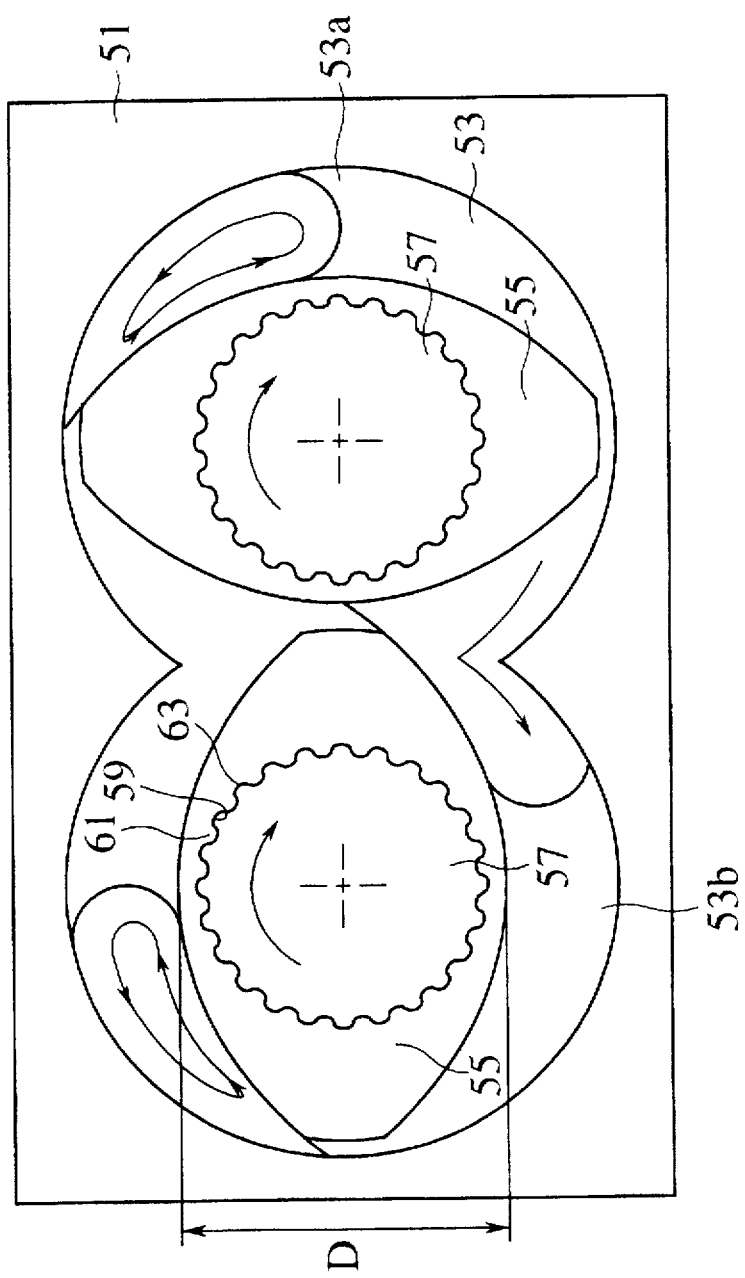
FIG. 1 is a cross sectional view showing a screw section of a conventional double spindle extruder having two meshing spindles rotating in the same direction.
Figure 2:
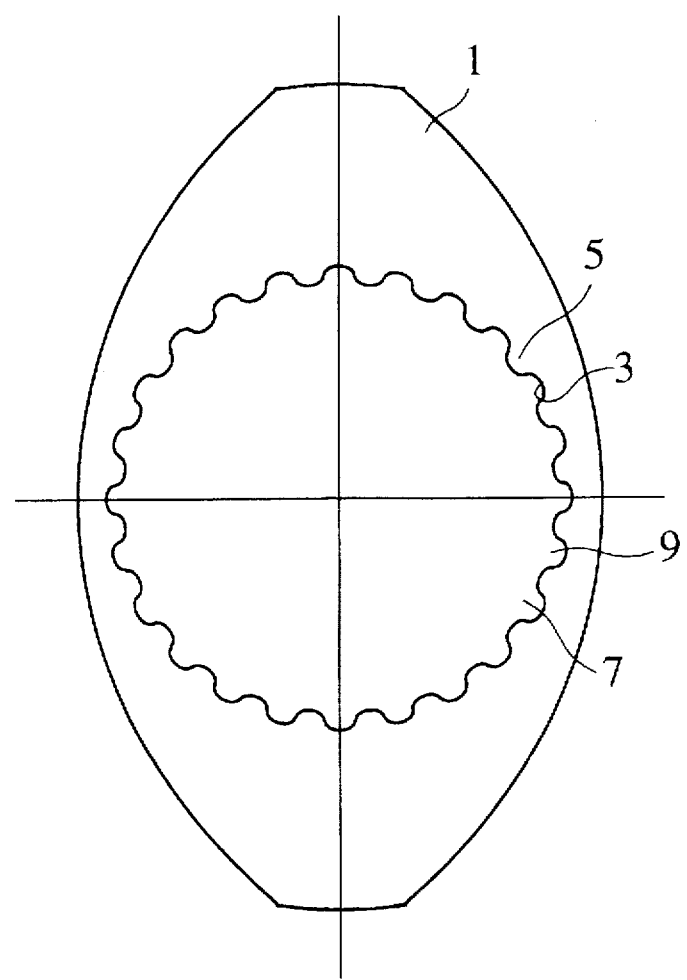
FIG. 2 is a cross sectional view of a spline applied for a spline for rotary element of a multi spindle extruder, in accordance with one embodiment of the present invention.

FIGS. 2 shows one embodiment of a spline in accordance with the present invention, which is applicable for a spline for rotary elements of a multi spindle extruder. In FIG. 2, reference numeral 1 designates a screw element having a rugby-ball shaped cross section, provided at a center thereof with an insertion hole 3 for a screw shaft 7. The screw element 1 further includes a spline 5 formed on an inner face of the insertion hole 3.

The screw shaft 7 is provided on an outer face thereof with another spline 9. The spline 9 is engageable with the spline 5 when the screw shaft 7 is inserted into the insertion hole 3. Owing to the spline 9, the screw element 1 can be connected to the screw shaft 7 in a relationship for transferring torque.

In a plane of x-y orthogonal coordinate system, each of the splines 5 and 9 has a tooth profile obtained by deforming a continuous line as if the x-axis in the plane ran over a center circle of predetermined radius. In connection, the continuous line before deformation is obtained by mutually connecting a semi-circular or semi-oval line, which is represented by an expression of $(x^2/a^2 + y^2/b^2 = 1)$ in a defined area of $y \geq 0$, with another semi-circular or semi-oval line, which is also represented by the expression of $(x^2/a^2 + y^2/b^2 = 1)$ in a remaining defined area of $y \leq 0$.

Figure 3A:
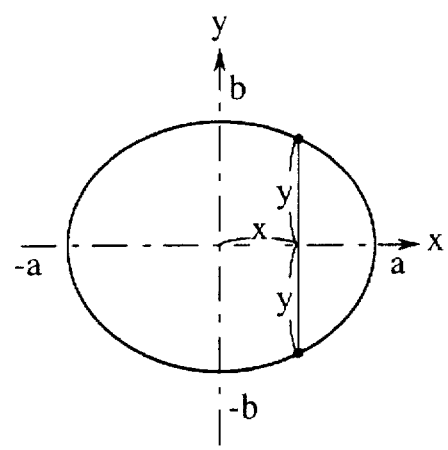
FIG. 3A is an explanatory diagram of the x-y orthogonal coordinate system, showing an oval contained therein.

The expression of $x^2/a^2 + y^2/b^2 = 1$ can be also represented by an expression of $y = \pm b\sqrt{(1 - x^2/a^2)}$. Thus, if given a condition of a>b, such an expression will exhibit an oval having a long axis extending along the x-axis, as shown in FIG. 3A.

Figure 3B:
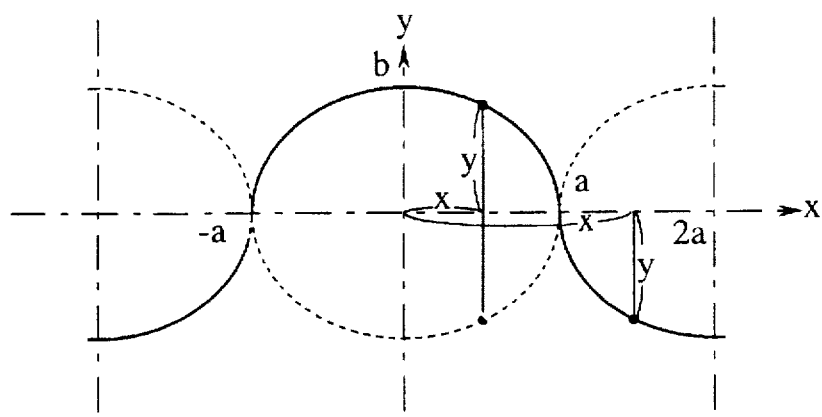
FIG. 3B is an explanatory diagram showing a continuous line on the basis of a tooth profile of the spline of the present invention.

The continuous line in this case will be one which is to be provided by connecting semi-ovals appearing in the defined area of $y \geq 0$, i.e., the first and second quadrants in the plane of x-y orthogonal coordinate system, with semi-ovals appearing in the defined area of $y \leq 0$, i.e., the third and fourth quadrants by turns, as shown in FIG. 3B. The line can be represented by expressions as follows:

$$y = b\sqrt{(1 - x^2/a^2)} \text{ in a range of } 0 < x < a,$$

$$y = -b\sqrt{(1 - (2a - x)^2/a^2)} \text{ in a range of } a < x < 2a,$$

Figure 3C:
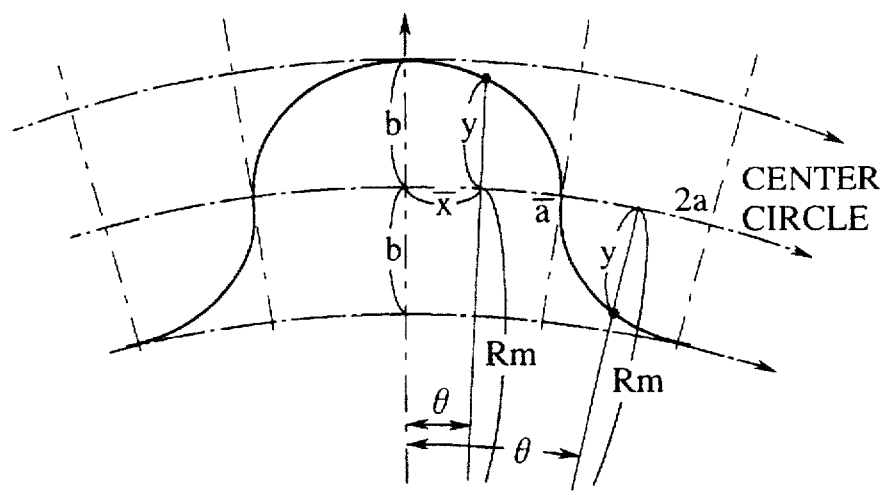
FIG. 3C is an explanatory diagram showing the tooth profile of the present invention.

By winding the above-mentioned continuous line in a manner that the x-axis thereof runs along the center circle with the curvature radius of Rm, a spline can be obtained to have a tooth profile as shown in FIG. 3C.

Providing that θ is given for an angle from the y-axis as a center of the origin of the coordinate axes, the above tooth profile can be provided by symmetrizing a curve, which is represented by the following expressions, with respect to the y-axis:

in a range of 0<θ<(a/Rm), $$x = \{Rm + b\sqrt{(1 - Rm^2\theta^2/a^2)}\}\sin\theta$$

$$y = \{Rm + b\sqrt{(1 - Rm^2\theta^2/a^2)}\}\cos\theta;$$

in a range of (a/Rm)<θ<(2a/Rm), $$x = \{Rm - b\sqrt{(1 - (2a - Rm\theta)^2/a^2)}\}\sin\theta$$

$$y = \{Rm - b\sqrt{(1 - (2a - Rm\theta)^2/a^2)}\}\cos\theta;$$

wherein, "Rm" is a radius of a center circle of the tooth profile;
  "θ" is a rotational angle from the y-axis as a center of the origin of the coordinate axes;
  "a" is a constant; and
  "b" is a constant.

Figure 3D:
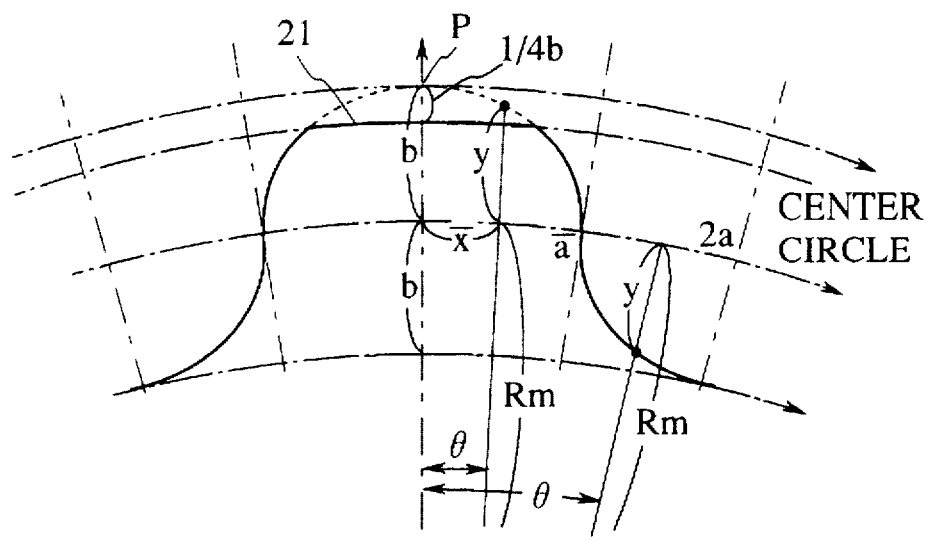
FIG. 3D is an explanatory diagram showing the actual tooth profile of the screw shaft of the present invention.
Figure 3E:
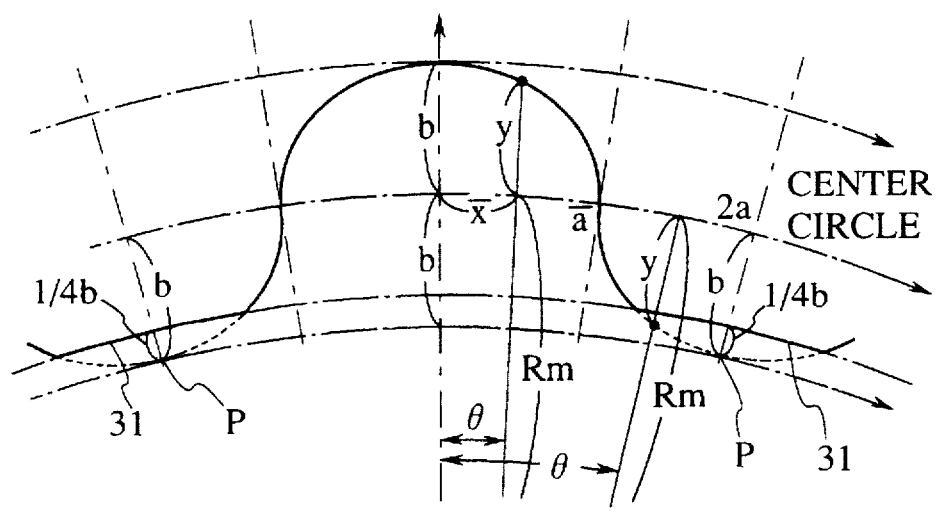
FIG. 3E is an explanatory diagram showing the actual tooth profile of the insertion hole of the present invention.

FIG. 3D shows actual shape of the spline 9 provided on an outer surface of the screw shaft 7. This spline 9 has a tooth crest 21 at the top portion of the tooth. The sectional shape of the tooth crest 21 consists of a part of the circle whose center is located at the same position as the center of the screw shaft 7. The position of the tooth crest 21 is retreated preferably by 1/4b from the top point P of the imaginary oval tooth shape. FIG. 3E shows actual shape of the spline 5 provided on an inner surface of the insertion hole 3. This spline 9 has a tooth crest 31 at the top portion of the tooth. The sectional shape of the tooth crest 31 consists of a part of the circle whose center is located at the same position as the center of the insertion hole 3. The position of the tooth crest 31 is retreated preferably by ¼b from the top point P of the imaginary oval tooth shape.

In the spline having such a tooth profile, the tooth face are intersecting with the center circle at right angles. Further, the spline is formed so as to have the semi-oval tooth forms contoured by respective continuous curves with large curvatures, which run from the center circle inwardly and outwardly. Accordingly, even if a great transfer torque is applied on connecting parts of the splines, it is difficult to occur the concentration of stress and to cause the radial expansion and the rotational shifting in even small diametrical parts of reduced thickness of the screw element 1. In addition, since it does not require a wasteful area for realizing the tooth profile having a large curvature, it does not cause a thickness of portions about the splines to be decreased. Consequently, it is seldom that the splines are subject to fatigue breaking, whereby the strength can be ensured.

According to the present spline having the semi-oval shaped tooth profile, it is possible to reduce the concentration of stress by 30 to 40 percent in comparison with the involute spline in case of the same number of teeth and the same tooth height.

Although in the above-mentioned embodiment the sectional shape of the tooth crest is a circular line, it is possible to employ a straight line as the sectional shape.

Although the above-mentioned embodiment employs the condition of a>b, it may be replaced with another condition of a=b in a modification. In such a case, the spline would be formed to have a semi-circular tooth profile. Alternatively, it may have a semi-oval tooth profile under condition of a<b.

Again, it may be applicable that the parameters (a) and (b) differ from each other in respective defined areas of y≧0 and y≦0.

Finally, it will be understood by those skilled in the art that the foregoing description is one of preferred embodiments of the disclosed spline, and that various changes and modifications may be made to the present invention without departing from the spirit and scope thereof.

What is claimed is:

1. A spline coupling comprising in combination, a driving member;

a driven member, said driving member and said driven member having concentric complementing spline teeth for transmitting torque therebetween, said spline teeth each having a tooth profile comprising:

in a plane of x-y orthogonal coordinate system, said tooth profile provided by deforming a continuous curve as if the x-axis of said plane containing said continuous curve ran on a center circle of predetermined radius;

wherein said continuous curve before deformation is a continuous line obtained by connecting a semi-circular or semi-oval line, said line being represented by an expression of $x^2/a^2+y^2/b^2=1$ (wherein a, b are constants) in a defined area of $y \geq 0$, with another semi-circular or semi-oval line, said another line being represented by the expression of $x^2/a^2+y^2/b^2=1$ (wherein a, b are constants) in a defined area of $y \leq 0$, by turns.

2. A spline coupling as claimed in claim 1, further comprising a tooth crest at a top portion of each of the spline teeth.

3. A spline coupling as claimed in claim 1, wherein the constant a in the expression is larger than the constant b.

4. A spline coupling as claimed in claim 1, wherein the constant a in the expression is equal to the constant b.

5. A spline coupling as claimed in claim 1, wherein the constant a in the expression is smaller than the constant b.

6. A spline coupling comprising in combination, a driving member;

a driven member, said driving member and said driven member having concentric complementing spline teeth for transmitting torque therebetween, said spline teeth each having a tooth profile comprising:

in a plane of x-y orthogonal coordinate system, said tooth profile provided by symmetrizing a curve with respect to the y-axis of said plane;

wherein said curve is represented by expressions as follows:

in a range of $0<\theta<(a/Rm)$, $$x = \{Rm + b\sqrt{(1 - Rm^2\theta^2/a^2)}\}\sin\theta$$

$$y = \{Rm + b\sqrt{(1 - Rm^2\theta^2/a^2)}\}\cos\theta;$$

in a range of $(a/Rm)<\theta<(2a/Rm)$, $$x = \{Rm - b\sqrt{(1 - (2a - Rm\theta)^2/a^2)}\}\sin\theta$$

$$y = \{Rm - b\sqrt{(1 - (2a - Rm\theta)^2/a^2)}\}\cos\theta;$$

wherein Rm is a radius of a center circle of said tooth profile;

θ is a rotational angle from the y-axis as a center of the origin of the coordinate axes;

a is a constant; and b is a constant.

7. A spline coupling as claimed in claim 6, further comprising a tooth crest at a top portion of each of the spline teeth.

8. A spline coupling as claimed in claim 6, wherein the constant a in the expression is larger than the constant b.

9. A spline coupling as claimed in claim 6, wherein the constant a in the expression is equal to the constant b.

10. A spline coupling as claimed in claim 6, wherein the constant a in the expression is smaller than the constant b.

11. A spline coupling for a multi spindle extruder, said spline coupling comprising in combination, a rotary element;

a drive shaft for rotating the rotary element; and concentric complementing spline teeth on the drive shaft and the rotary element for transmitting torque from the shaft to the rotary element, the spline teeth each having a tooth profile comprising:

in a plane of x-y orthogonal coordinate system, said tooth profile provided by deforming a continuous curve as if the x-axis of said plane containing said continuous curve ran on a center circle of predetermined radius;

wherein said continuous curve before deformation is a continuous line obtained by connecting a semi-circular or semi-oval line, said line being represented by an expression of $x^2/a^2+y^2/b^2=1$ (wherein a, b are constants) in a defined area of $y \geq 0$, with another semi-circular or semi-oval line, said another line being represented by the expression of $x^2/a^2+y^2/b^2=1$ (wherein a, b are constants) in a defined area of $y \leq 0$, by turns.

12. A spline coupling as claimed in claim 11, further comprising a tooth crest at a top portion of each of the spline teeth.

13. A spline coupling as claimed in claim 11, wherein the constant a in the expression is larger than the constant b.

14. A spline coupling as claimed in claim 11, wherein the constant a in the expression is equal to the constant b.

15. A spline coupling as claimed in claim 11, wherein the constant a in the expression is smaller than the constant b.

16. A spline coupling for a multi spindle extruder, said spline coupling comprising in combination, a rotary element;

a drive shaft for rotating the rotary element; and concentric complementing spline teeth on the drive shaft and the rotary element for transmitting torque from the drive shaft to the rotary element, the spline teeth each having a tooth profile comprising:

in a plane of x-y orthogonal coordinate system, said tooth profile provided by symmetrizing a curve with respect to the y-axis of said plane;

wherein said curve is represented by expressions as follows:

in a range of $0<\theta<(a/Rm)$, $$x = \{Rm + b\sqrt{(1 - Rm^2\theta^2/a^2)}\}\sin\theta$$

$$y = \{Rm + b\sqrt{(1 - Rm^2\theta^2/a^2)}\}\cos\theta;$$

in a range of $(a/Rm)<\theta<(2a/Rm)$, $$x = \{Rm - b\sqrt{(1 - (2a - Rm\theta)^2/a^2)}\}\sin\theta$$

$$y = \{Rm - b\sqrt{(1 - (2a - Rm\theta)^2/a^2)}\}\cos\theta;$$

wherein Rm is a radius of a center circle of said tooth profile;

θ is a rotational angle from the y-axis as a center of the origin of the coordinate axes;

a is a constant; and b is a constant.

17. A spline coupling as claimed in claim 16, further comprising a tooth crest at a top portion of each of the spline teeth.

18. A spline coupling as claimed in claim 16, wherein the constant a in the expression is larger than the constant b.

19. A spline coupling as claimed in claim 16, wherein the constant a in the expression is equal to the constant b.

20. A spline coupling as claimed in claim 16, wherein the constant a in the expression is smaller than the constant b.

* * * * *